United States Patent
Fisher et al.

(10) Patent No.: US 8,951,356 B2
(45) Date of Patent: Feb. 10, 2015

(54) PHOTOVOLTAIC ARRAY PERFORMANCE MONITORING SYSTEM

(76) Inventors: Bryan Fisher, Huntington Beach, CA (US); Catlin Mattheis, San Luis Obispo, CA (US); Scott Lewis, Mountain View, CA (US)

( * ) Notice: Subject to any disclaimer, the term of this patent is extended or adjusted under 35 U.S.C. 154(b) by 641 days.

(21) Appl. No.: 13/331,904

(22) Filed: Dec. 20, 2011

(65) Prior Publication Data

US 2013/0159064 A1 Jun. 20, 2013

(51) Int. Cl.
*B08B 7/04* (2006.01)

(52) U.S. Cl.
USPC ........ 134/18; 134/58 R; 134/56 R; 134/57 R; 700/275; 705/7.36

(58) Field of Classification Search
None
See application file for complete search history.

(56) References Cited

U.S. PATENT DOCUMENTS

| | | | |
|---|---|---|---|
| D243,185 S | 1/1977 | Parker et al. | |
| 4,914,044 A | 4/1990 | Grabmaier et al. | |
| D479,191 S | 9/2003 | Peress et al. | |
| D599,286 S | 9/2009 | Horito et al. | |
| D617,265 S | 6/2010 | Sasada et al. | |
| D620,431 S | 7/2010 | Sasada et al. | |
| D625,251 S | 10/2010 | Workman et al. | |
| 2009/0234685 A1 | 9/2009 | Tarbell et al. | |
| 2009/0266353 A1 | 10/2009 | Lee | |
| 2009/0287446 A1 | 11/2009 | Wang et al. | |
| 2009/0313056 A1 | 12/2009 | Beekhuis | |
| 2011/0067743 A1 | 3/2011 | Pan | |

FOREIGN PATENT DOCUMENTS

| | | |
|---|---|---|
| CN | 201662913 | 12/2010 |
| JP | 2002272017 | 9/2002 |
| JP | 2002289883 | 10/2002 |

*Primary Examiner* — Eric Golightly
(74) *Attorney, Agent, or Firm* — Koppel, Patrick, Heybl & Philpott

(57) ABSTRACT

Photovoltaic array performance monitoring is disclosed herein. A photovoltaic array performance monitoring system may include a data acquisition unit coupled with reference and ambient photovoltaic panels. The reference photovoltaic panel is equipped with a soiling removal unit which periodically removes deposited soiling materials from an active photovoltaic collection area of the reference photovoltaic panel. The ambient photovoltaic panel accumulates light obscuring soiling materials at a rate approximately equal to those of a proximate photovoltaic array. The data acquisition unit periodically sends electrical energy measurements of the reference and ambient photovoltaic panels to a computing system. Over time, the electrical energy output differential between the reference and ambient photovoltaic panels exceeds a predetermined threshold. The computing system evaluates the electrical energy measurements and determines when it would be cost-effective to clean the photovoltaic array. The result is output in a human cognizable format and/or a machine readable format.

19 Claims, 4 Drawing Sheets

PHOTOVOLTAIC ARRAY PERFORMANCE MONITORING SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This application is directed generally toward photovoltaic arrays and more specifically to photovoltaic array monitoring equipment.

2. Description of the Related Art

Photovoltaic arrays are increasingly being installed as an alternative to fossil fuels which generate greenhouse gases. For efficient operation, the photovoltaic panels which comprise a photovoltaic array require an unobstructed view of the sun to generate maximum power output during daylight hours. In certain installations, particularly in arid desert regions, soiling of the photovoltaic array due to collection of dust and other debris upon the photovoltaic array reduces the amount of electricity generated.

Given the passive nature of the photovoltaic array, sites of photovoltaic arrays are typically unmanned for extended periods of time. Thus, declining electrical generation from the photovoltaic arrays may go unnoticed. Accordingly, there is a need to address soiling of the photovoltaic arrays before significant energy generation is compromised.

SUMMARY

Photovoltaic array performance monitoring systems are described herein. In one embodiment, a data acquisition unit receives electrical energy generated by a reference photovoltaic panel and electrical energy generated by an ambient photovoltaic panel. The data acquisition unit periodically measures the electrical energy generated by the reference photovoltaic panel and the ambient photovoltaic panel; encode indicia of the measured electrical energy according to a communications protocol; and send the encoded indicia of the electrical energy measurements to a computing system. A communications interface may be included with the data acquisition unit to transmit the encoded indicia of the electrical energy measurements to the computing system.

The data acquisition unit may include or be coupled with a soiling removal unit. When energized, the soiling removal unit removes deposited soiling materials from an active photovoltaic collection area associated with the reference photovoltaic panel. The soiling removal unit may include a fluid pump to draw a liquid cleaning solution from a reservoir and forcibly discharge the cleaning solution through a spray nozzle onto an active photovoltaic collection area of the reference photovoltaic panel, thereby removing accumulated soiling materials.

The ambient photovoltaic panel is disposed in proximity to the reference photovoltaic panel such that spatial distribution of the soiling materials are approximately equal upon the active photovoltaic collection area of the reference photovoltaic panel and an active photovoltaic collection area of the ambient photovoltaic panel. Initially, the reference and ambient photovoltaic panels generate approximately the same amount of electrical energy under equivalent daylight conditions.

The computing system includes instructions which when executed by a processing unit cause the processing unit to prepare electrical differential data from the encoded indicia of electrical energy measurements; compare the data representing temporal changes in revenue with data representing remediation costs to remove the soiling from the photovoltaic array and output a message in a human cognizable or machine readable format when removal of deposited soiling materials is cost effective relative to a decline in revenue due to soiling of the photovoltaic array.

The electrical differential data has a functional relationship with the data representing the temporal changes in revenue derived from sales of electrical energy produced by the photovoltaic array. The greater the electrical differential data the greater deposition of soiling materials upon the power generating photovoltaic array.

The cost-effectiveness may represent a temporal point where the financial cost of lost revenue due to soiling of the photovoltaic array is equal to or greater than a remediation cost to remove the soiling.

To ascertain the amount of depositional soiling of the power generating photovoltaic array, the reference and ambient photovoltaic panels are disposed in proximity to the power generating photovoltaic array such that a spatial distribution of the soiling materials are approximately equal upon the active photovoltaic collection areas of the reference, ambient photovoltaic panels and those of the photovoltaic array.

DETAILED DESCRIPTION

Various embodiments of a photovoltaic array performance monitoring system are disclosed herein. In the following detailed description, specific details are set forth to provide a thorough understanding of the system. It will be apparent to one skilled in the art that the inventive embodiments may be practiced without these specific details. In other instances, well-known structures, devices or components may be shown in block diagram form to avoid unnecessarily obscuring the inventive embodiments.

Figure 1:
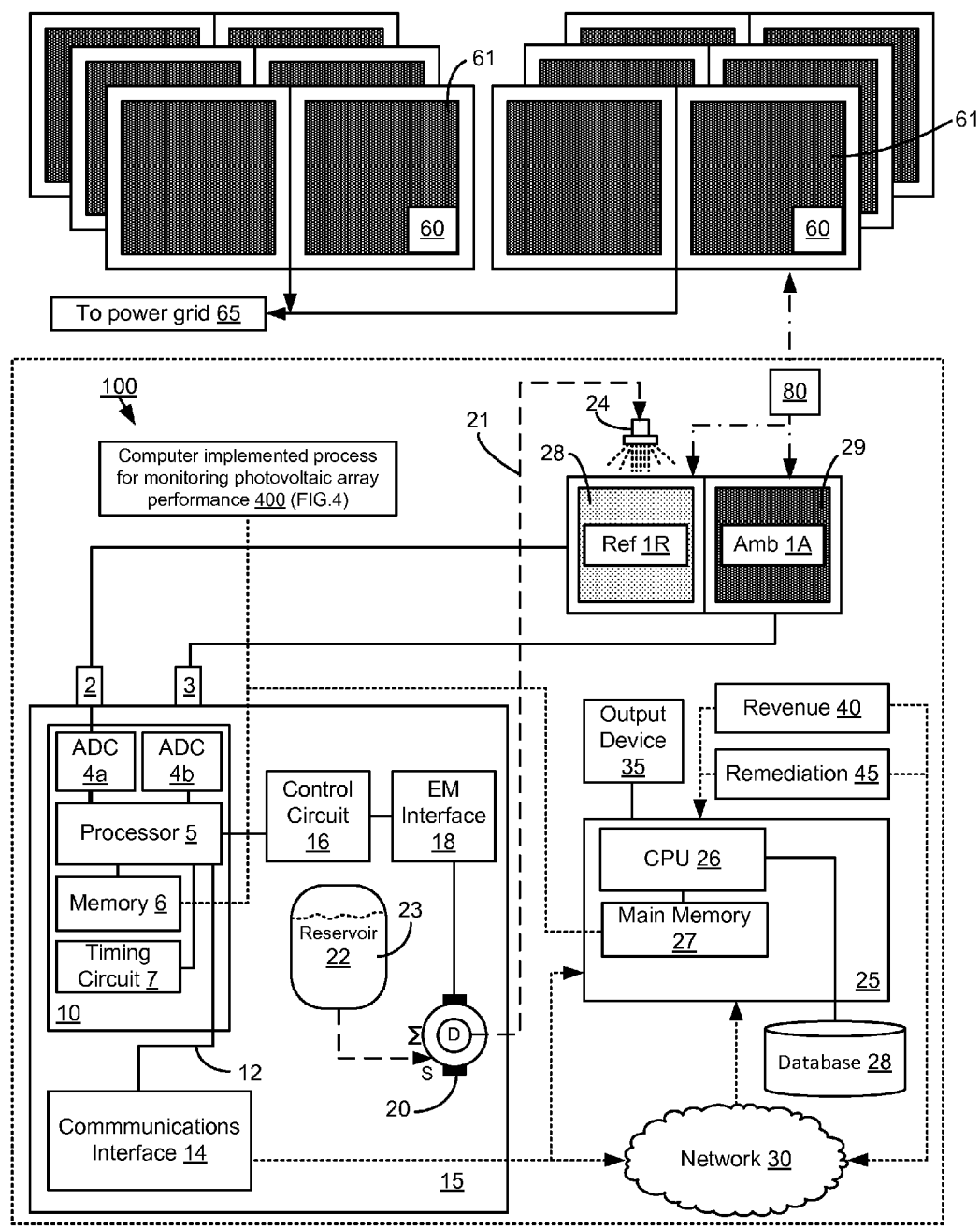
FIG. 1 is a block diagram of a photovoltaic array performance monitoring apparatus described herein.

Referring to FIG. 1, a block diagram of a photovoltaic array monitoring system 100 in accordance with the system described herein. In one embodiment, the photovoltaic array monitoring system 100 comprises a data acquisition unit 15 electrically coupled via reference and ambient inputs 2, 3 with a reference photovoltaic panel 1R and an ambient photovoltaic panel 1A. In this embodiment, the data acquisition unit 15 includes a programmable integrated circuit (PIC) 10 which includes a processor 5 having operatively coupled thereto: a memory 6 for storing programmatic instructions 400 (FIG. 4) executable by the processor 5; a timing circuit 7 to activate a control circuit 16 at predetermined times and/or durations according to the programmatic instructions 400 (FIG. 4); first and second analog to digital converters (ADC) 4a, 4b to convert analog reference and ambient electrical energy applied to the reference and ambient inputs 2, 3 into a digital format compatible with the processor 5.

The programmatic instructions 400 (FIG. 4) comprise computer executable instructions stored on a computer readable medium (memory 6) such as, for example, ROM, RAM and/or EEPROM which form part of the PIC 10. An example suitable PIC 10 is model PIC18F27J13 available from MicroChip, Inc. Other PICs or intelligent devices may be used. For example, an application specific integrated circuit (ASIC), a field programmable gate array (FPGA), a programmable logic device (PLD), a programmable logic array (PLA), a microprocessor provided with suitable analog to digital circuitry, timing circuitry, and/or control circuitry, and like devices. The data acquisition unit 15 may utilize a separate microprocessor, for example an advanced RISC machine (ARM), or similar processors manufactured by Intel, AMD, Texas Instruments to name a few.

A communications interface 14 may be operatively coupled with the processor 5 over a communications bus 12. The communications interface 14 encodes indicia of electrical energy measured by the processor 5 from the reference and ambient inputs 2, 3 using the ADCs 4a, 4b into a communications protocol for communicating with a computing system 25. The computing system 25 may be communicatively coupled with the data acquisition unit 15 wired or wirelessly directly or over network 30. Communications with the computing system 25 may be performed using any of a plurality of communications techniques including but not limited to direct serial connection, PSTN dial-up connection, cellular network, microwave, BlueTooth, WiFi, ZigBee or a packet switched network (e.g., Internet.) The network 30 may be the Internet, the PSTN, a private network, a public network, a cellular telephone network, or a combination of these.

The control circuit 16 is operatively coupled to an electromechanical interface 18 which when activated, energizes a fluid pump 20. The control circuit 16 provides the control logic to energize/de-energize the fluid pump 20 using the electromechanical interface 18 to supply or disconnect power to the fluid pump 20. When energized, the fluid pump 20 draws a liquid cleaning fluid 23 from a reservoir 22 in fluidic communication with a suction side S of the fluid pump 20. The liquid cleaning fluid 23 is discharged D from the fluid pump 20 through a spray nozzle 24 and onto an active photovoltaic collection area 28 of the reference photovoltaic panel 1R with sufficient force/volume to substantially remove soiling materials deposited upon the active photovoltaic collection area 28 of the reference photovoltaic panel 1R. A fluid conduit 21 may be used to convey the cleaning fluid 20 discharged by the fluid pump 20 into the spray nozzle 24.

The combination of the reservoir 22 the fluid pump 20 and the spray nozzle 24 are referred to herein as a soiling removal unit. The soiling removal unit may also include one or more of the fluid conduit 21, the control circuit 16 and/or the electromechanical interface 18.

The programmatic instructions 400 (see FIG. 4) stored in memory 6 cause the processor 5 to activate the control circuit 16 at predetermined times and for predetermined durations to ensure that the reference photovoltaic panel 1R remains substantially free of light obstructing depositional materials referred to herein as soiling materials. Stated another way, the soiling removal unit is regularly activated to clean the reference photovoltaic panel 1R. The term soiling materials includes some or all of dirt, dust, grime, insects, mineral build up, bird feces, pollen, seeds, detritus, and the like. The term soiling materials may also be referred to as depositional material, obstructing materials or fouling materials.

The reference and ambient photovoltaic panels 1R and 1A are disposed in sufficient proximity 80 to a photovoltaic array 60 such that a spatial distribution of deposited soiling materials are approximately equal upon the active photovoltaic collection areas 28, 29 of the reference and ambient photovoltaic panels 1R and 1A and at least a portion of those 61 of the photovoltaic array 60. In one embodiment, the reference and ambient photovoltaic panels 1R and 1A are reduced in size from a full size photovoltaic panel of the photovoltaic array 60. This reduction in size allows for placement of the reference and ambient photovoltaic panels 1R and 1A in sufficient proximity to the photovoltaic array 60 to encounter substantially similar depositional soiling. The reduction in size may be scaled anywhere between 33-75% of a full size photovoltaic panel. When mounted in proximity to the photovoltaic array 60, the reference and ambient photovoltaic panels 1R and 1A are aligned such that their associated active photovoltaic collection surfaces 28, 29 parallels the active photovoltaic collection surfaces 61 of the photovoltaic array 60.

In another embodiment, a pair of existing full size photovoltaic panels may be retrofitted to allow connection to the data acquisition unit 15. One of the retrofitted panels may receive the benefits of the soiling removal unit and be considered the reference photovoltaic panel 1R, and the other photovoltaic panel may be considered the ambient photovoltaic panel 1A.

In either embodiment, the ambient photovoltaic panel 1R lacks the soiling removal unit, thus soiling of the ambient photovoltaic panel 1R reduces the amount of electrical energy provided to the ambient input 3 which allows for temporal comparison with the amount of electrical energy incident upon the reference input 2.

The data acquisition unit 15 measures the electrical energy incident upon the reference and ambient inputs 2, 3 at predetermined intervals, encodes the electrical energy measurements into a communication protocol and transmits the encoded electrical energy measurements to the computing system 25. The computing system 25 includes a central processing unit (CPU) 26 and a main memory 27 coupled thereto. The main memory 27 includes programmatic instructions 400 (FIG. 4) executable by the CPU 25 to determine when cleaning of the photovoltaic array 60 is cost-effective relative to revenue lost due to soiling of the photovoltaic array 60. This determination is based upon temporal revenue data 40 derived from sales of generated electrical energy and remediation cost data 45 to clean the photovoltaic array 60. The result of this determination may be output to an output device 35 in a human cognizable format and/or output in a machine readable format for storage in a database 28 functionally coupled to the CPU 26. Output device 35 may be a computer terminal, a dedicated panel, a simple LED, depending on the specific implementation.

The data acquisition unit 15 and the computing system 25 may be combined into a single unit which performs the computer implemented process 400 and outputs its determination over the communications network 30 to a remote user.

Figure 2:
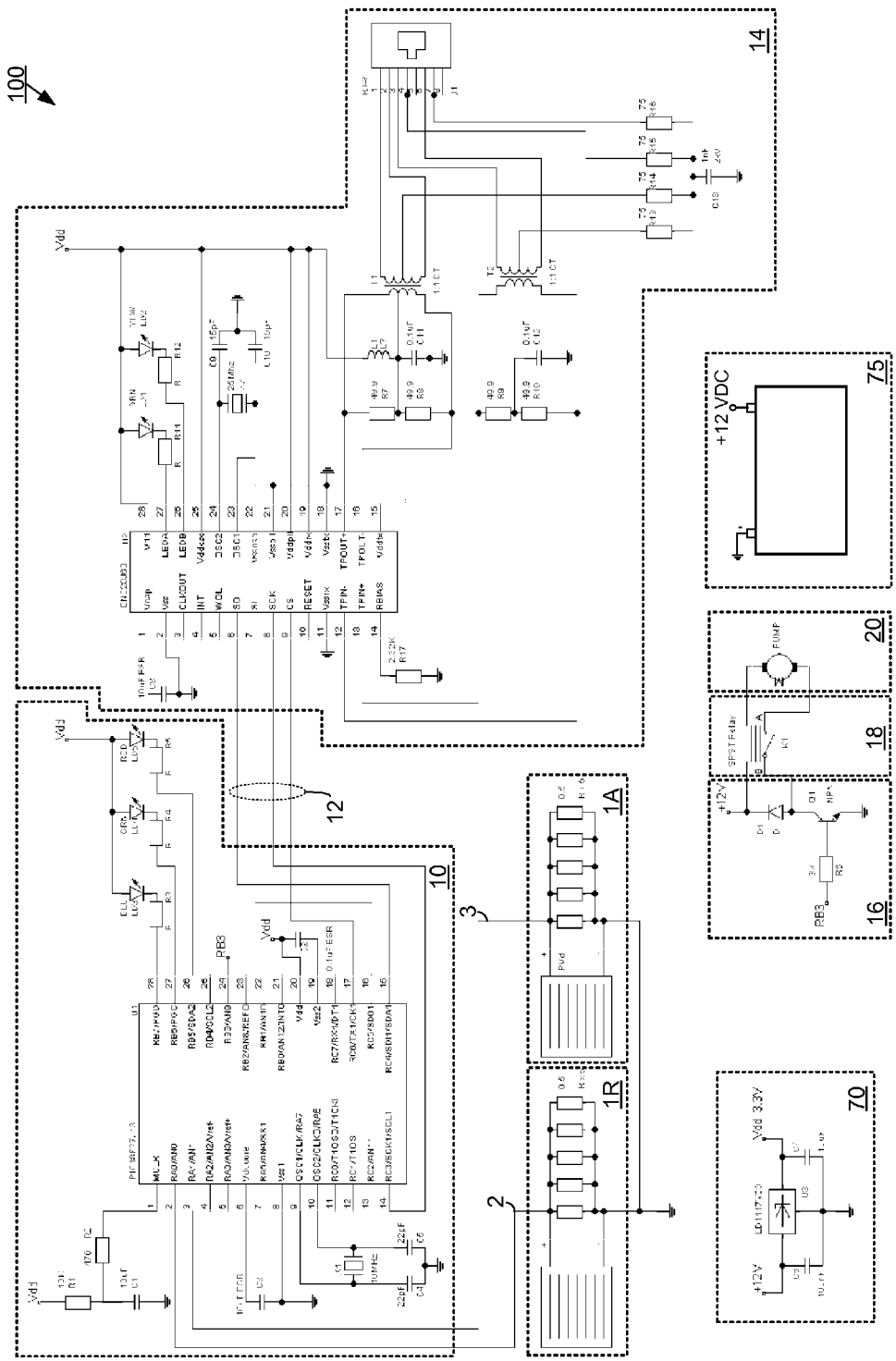
FIG. 2 is an electrical circuit diagram of an example data acquisition unit of the photovoltaic array performance monitoring system described herein.

Referring to FIG. 2, an electrical circuit diagram of a data acquisition unit 15 of the photovoltaic array performance monitoring system is depicted. In this embodiment, the data acquisition unit 15 utilizes a programmable integrated circuit (PIC) 10. Pins 2 and 3 correspond to the analog reference and ambient inputs 2, 3 in which the reference and ambient photovoltaic panels 1R, 1A are connected. Calibration resistors may be provided for the reference and ambient photovoltaic panels 1R, 1A to compensate for minor differences in output under identical conditions.

Internal to the PIC 10, pins 2 and 3 are coupled to ADC's 4a, 4b discussed previously. The output of the ADCs 4a, 4b is periodically measured by the processor 5 and sent serially over the communications bus 12 using PIC 10 pins 14-17 to the communication interface 14. In this embodiment, the communications interface 14 encodes the received data (indicia of electrical energy) in packets compatible with TCP/IP. The communications interface 14 may be or include a network interface card or unit (NIC). The output from the communications interface 14 may be connected to a standard nine pin RJ46 jack or other connector.

Time-keeping by the data acquisition unit 15 may be accomplished using an internal clock and/or an external standard time-keeping reference.

The data acquisition unit 15 also houses the control circuit 16, electromechanical interface 18, fluid pump 20 and fluid reservoir 22. Power to the data acquisition unit may be supplied by power supply. The power supply may be an internal 12 VDC battery 70. The power supply directly powers a portion of the control circuit 18 coupled to the electromechanical interface 20 (relay) and the fluid pump 20 when energized by the electromechanical interface 20. A voltage regulator circuit 75 may be provided to step down the 12 VDC battery voltage to 3.3 VDC. The 3.3 VDC output of the voltage regulator circuit 75 supplies power to the PIC 10 and communications interface 14.

The power supply may be a standard AC-DC converter that may convert 120VAC to 12VDC.

Either or both the data acquisition unit 15 and/or communications interface 14 may be equipped with light emitting diodes which illuminate to indicate a state of the device they are coupled with.

Figure 3:
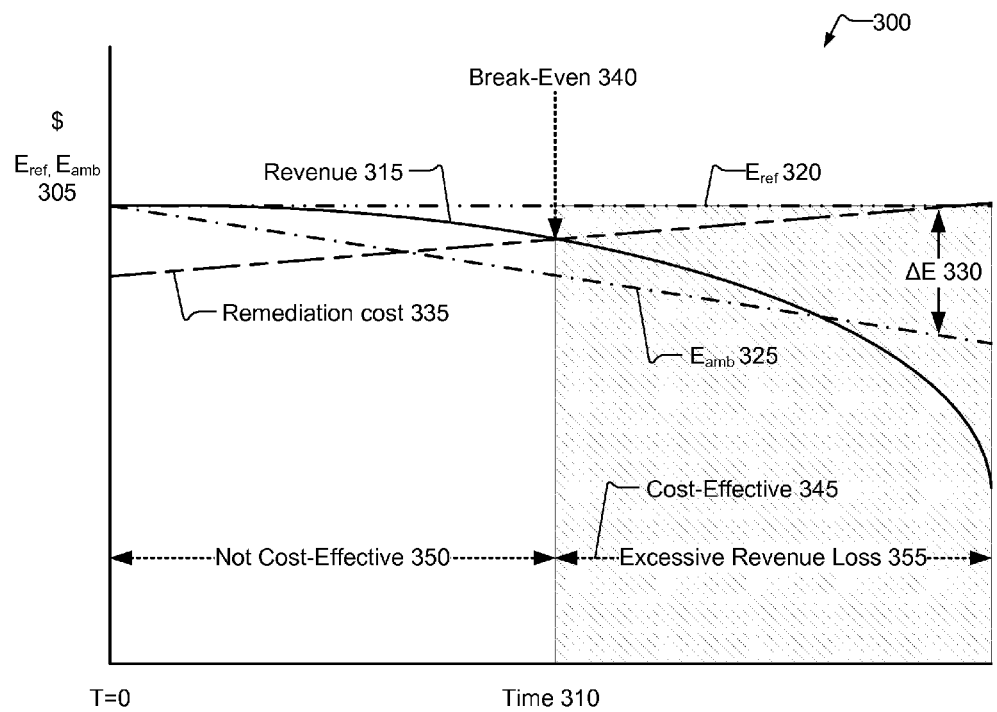
FIG. 3 is graph showing a temporal revenue and electrical output in accordance with the photovoltaic array performance monitoring system described herein.

Referring to FIG. 3, a graph showing temporal revenue 315, remediation cost 335 and electrical output $E_{ref}$ 320, $E_{amb}$ 325 is depicted. The ordinate 305 of the chart 300 provides relative revenue 315 produced from sales of electricity generated by the photovoltaic array 60, relative temporal electrical output $E_{ref}$ 320 from the reference photovoltaic panel 1R, relative temporal electrical output $E_{amb}$ 325 from the ambient photovoltaic panel 1R and relative cost to remediate 335 the photovoltaic array 60. The abscissa 310 of the chart 300 is time 310.

The curves shown are simplified for clarity of the concepts and to avoid variations in electrical output due to seasonal changes in solar incidence upon the photovoltaic array 60, reference and ambient photovoltaic panels 1R, 1A; variations in revenue due to changes in sales price per kilowatt-hour generated by the photovoltaic array 60; and presumed rising remediation cost over time due to greater effort required in removing accumulated deposits (soiling) from the photovoltaic array 60. In actuality, the curves are not linear due to rapid changes in wholesale electric pricing (hour-to-hour) and potential unpredictability of remediation costs.

The relative electrical output $E_{ref}$ 320 measured from the reference photovoltaic panel 1R and relative electrical output $E_{amb}$ 325 measured from the ambient photovoltaic panel 1A and revenue 315 are likewise presumed to be obtained at the same time of day (e.g., 12 noon) during daylight hours.

As previously discussed, the computing system 25 determines from the electrical indicia data when it is cost-effective to perform remediation of the photovoltaic array 60. At time T=0, the electrical outputs $E_{ref}$ 320, $E_{amb}$ 325 from the reference and ambient panels 1R and 1A are essentially equal. As time progresses, electrical output $E_{amb}$ 325 from the ambient photovoltaic panel 1A and the photovoltaic array 60 become souled with light attenuating materials deposited on their respective active photovoltaic collection areas 29, 61. At some point in time the electrical differential ΔE 330 between the reference and ambient panels 1R and 1A at a given daylight time becomes significant enough to evaluate whether the photovoltaic array 60 requires remediation. The electrical differential ΔE 330 has a functional relationship with the cost of remediation 335 and revenue 315 which may be defined either empirically or by modeling.

The break-even point 340 is where the declining revenue 315 curve intersects the cost to perform remediation 335. Prior to reaching the break-even point 340, it is not cost-effective 350 to perform remediation of the photovoltaic array 60 as the cost to remediate the photovoltaic array 60 exceeds the amount of revenue 315 lost due to soiling. Once the break-even point 340 is achieved, it becomes cost-effective to remediate (that is, clean or de-soil) the photovoltaic array 60 to avoid excessive revenue loss 355. When the break-even point 340 is reached, or shortly after, the entity responsible for the photovoltaic array 60 may perform remediation (cleaning, washing, desoiling) of the photovoltaic array 60. When the break-even point 340 is reached, or shortly before or after, the entity responsible for the photovoltaic array 60 may to seek a qualified bidder to perform remediation (cleaning, washing, desoiling) of the photovoltaic array 60. The qualification may be based on one or more considerations including lowest cost and scheduling availability.

Figure 4:
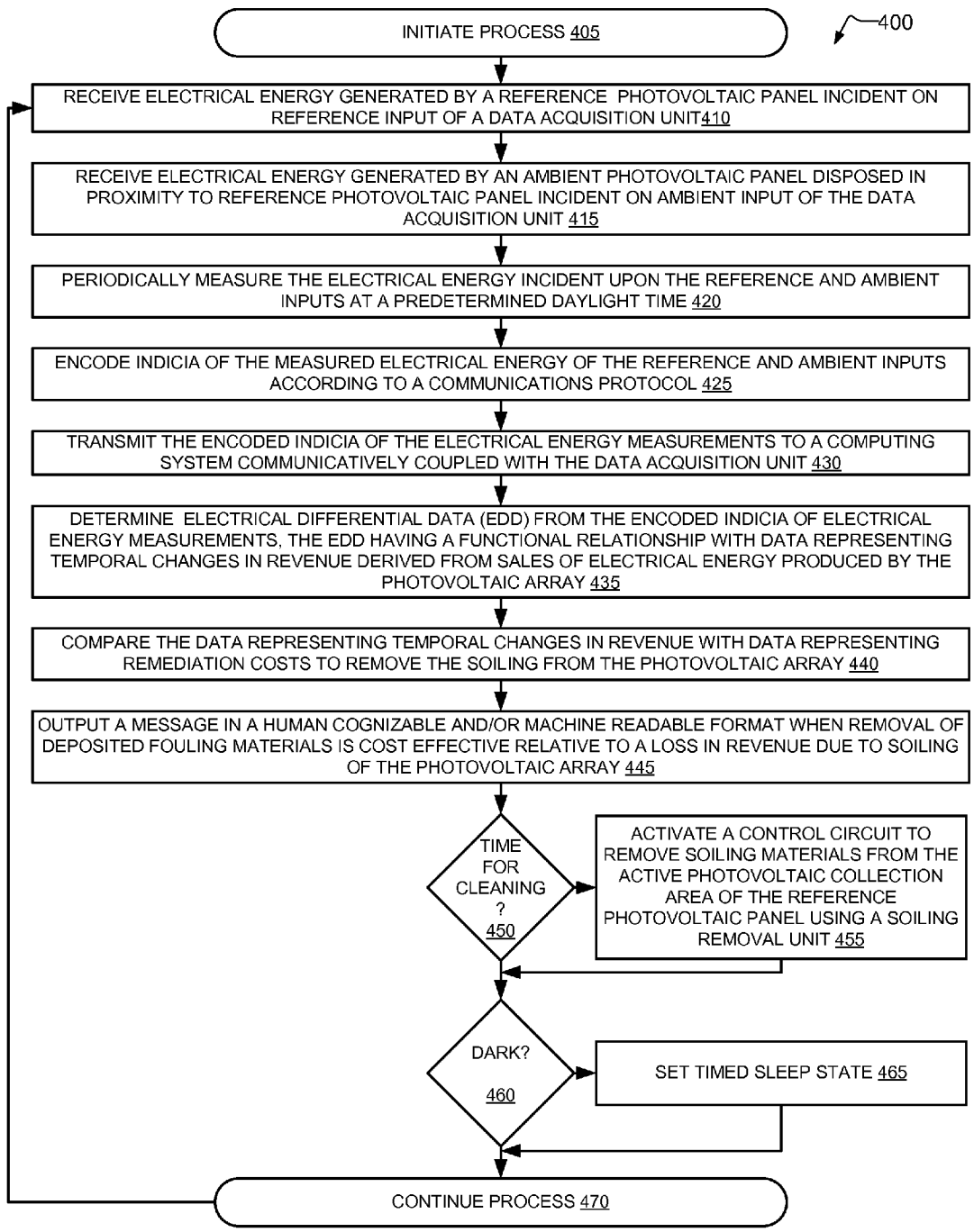
FIG. 4 is a flow chart of a computer implemented process for monitoring photovoltaic array performance in accordance the system described herein.

Referring to FIG. 4, a flow chart of a computer implemented process 400 for monitoring photovoltaic array performance in accordance with the system described herein is depicted. The process is initiated at block 405 and proceeds to block 410. At block 410, a data acquisition unit receives electrical energy generated by a reference photovoltaic panel incident on a reference input of the data acquisition unit. Processing continues at block 415.

At block 415, the data acquisition unit receives electrical energy generated by an ambient photovoltaic panel disposed in proximity to a reference photovoltaic panel incident on an ambient input of the data acquisition unit. Processing then continues at block 420.

At block 420, a processor associated with the data acquisition unit periodically measures the electrical energy incident upon the reference and ambient inputs at a predetermined daylight time. Processing then continues at block 425.

At block 425, the processor associated with the data acquisition unit encodes indicia of the measured electrical energy of the reference and ambient inputs according to a communications protocol. Processing then continues at block 430.

At block 430, the encoded indicia of electrical energy measurements are transmitted to a computing system communicatively coupled with the data acquisition unit. Processing then continues at block 435.

At block 435, a central processing unit associated with the computing system prepares electrical differential data (EDD) from the encoded indicia of electrical energy measurements, the EDD having a functional relationship with data representing temporal changes in revenue derived from sales of electrical energy produced by a photovoltaic array. Processing then continues at block 440.

At block 440, the central processing unit associated with the computing system compares the data representing temporal changes in revenue with data representing remediation costs to remove soiling from the photovoltaic array. Processing then continues at block 445.

At block 445, the central processing unit associated with the computing system outputs a message in a human cognizable and/or machine readable format when removal of deposited soiling materials is cost-effective relative to a loss in revenue due to soiling of the photovoltaic array. Processing then continues at block 450.

At decision block 450, the processor associated with the data acquisition unit determines whether it is time for cleaning of the reference photovoltaic panel. If the processor associated with the data acquisition unit determines that it is not time for cleaning of the reference photovoltaic panel, processing continues at decision block 460. At block 455, if the time for cleaning of the reference photovoltaic panel has arrived, the control circuit initiates removal of soiling materials from the photovoltaic collection area of the reference photovoltaic panel using a soiling removal unit. Processing then continues at decision block 460.

At decision block 460, the processor associated with the data acquisition unit determines whether it is dark or reduced light such as, for example, when it is night or cloudy. If the processor associated with the data acquisition unit determines that it is not dark, processing continues at block 470 which restarts the process at block 410. Alternately, if the processor associated with the data acquisition unit determines that it is dark, processing continues at block 465. The determination of whether it is dark may be made based on observed light conditions and/or by reference to a clock and stored daylight information.

At block 465, the processor associated with the data acquisition unit sets a timed sleep state which reduces power consumption of the data acquisition unit. Once the sleep state time has expired, processing continues at block 470 which restarts the computer implemented process at block 410. The length of the timed sleep state may be an hour, such that the system hourly checks to see if it is light. The system may access locally or remotely stored daylight information that provides data about sunrise and sunset times. The system may use the stored daylight information to compute the length of the timed sleep state on a daily basis or may have the length available in a pre-computed lookup table. In this way, the system may automatically turn on or off based on the stored daylight information.

In other embodiments, the system may sleep daily or weekly such that the data acquisition unit only wakes up once a day or once a week, or other regular or irregular period of time or days. In one embodiment, whenever the data acquisition unit wakes, it automatically activates the soiling removal unit to clean the reference photovoltaic panel.

The various exemplary embodiments described herein are intended to be illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that the data acquisition unit 15 may utilize different electronic components and layouts than those described herein. No specific limitation is intended to executable instruction sequences described herein. Other variations and inventive embodiments are possible in light of the above teachings, and it is not intended that the inventive scope be limited by this specification, but rather by the claims following herein.

It is claimed:

1. A photovoltaic array performance monitoring system comprising:
    a data acquisition unit having a reference electrical input and an ambient electrical input, the reference input adapted to receive electrical energy generated by a reference photovoltaic panel, the reference photovoltaic panel including a soiling removal unit configured to remove deposited soiling materials from an active photovoltaic collection area of the reference photovoltaic panel;
    the ambient input adapted to receive electrical energy generated by an ambient photovoltaic panel, the ambient photovoltaic panel being disposed in proximity to the reference photovoltaic panel such that a spatial distribution of the soiling materials is approximately equal upon the active photovoltaic collection area of the reference and ambient photovoltaic panels; and
    the data acquisition unit including a processor and a memory functionally coupled thereto, the memory including instructions which when executed by the processor cause the processor to:
        regularly initiate the soiling removal unit cleaning the reference photovoltaic panel;
        periodically measure the electrical energy incident upon the reference and ambient inputs;
        encode indicia of the measured electrical energy of the reference and ambient inputs into a communications protocol; and
        transmit the encoded indicia of the electrical energy measurements to a computing system communicatively coupled with the data acquisition unit.

2. The photovoltaic array performance monitoring system of claim 1 wherein the reference and ambient photovoltaic panels are disposed in proximity to the photovoltaic array such that a spatial distribution of the soiling materials are approximately equal upon active photovoltaic collection areas of the reference and ambient photovoltaic panels and at least a portion of photovoltaic collection areas of the photovoltaic array.

3. The photovoltaic array performance monitoring system of claim 1 wherein the data acquisition unit further comprises:
    a control circuit coupled to the soiling removal unit, the control circuit to cause the soiling removal unit at predetermined time intervals to remove deposited soiling materials from the active photovoltaic collection area of the reference photovoltaic panel.

4. The photovoltaic array performance monitoring system of claim 3 wherein the soiling removal unit comprises:
    a pump;
    a reservoir in fluidic communication with a suction side of the pump;
    a spray nozzle in fluidic communication with a discharge side of the pump;
    an electromechanical interface functionally coupled to the control circuit and the pump, the electromechanical interface adapted to operate the pump when activated by the control circuit.

5. The photovoltaic array performance monitoring system of claim 4 wherein the reservoir contains a cleaning fluid which is drawn into the pump during pump operation and discharged through the spray nozzle onto the active photovoltaic collection area of the reference photovoltaic panel.

6. The photovoltaic array performance monitoring system of claim 1 wherein the data acquisition unit further comprises:

a communications interface functionally coupled to the processor to enable the data acquisition unit to transmit the encoded electrical energy measurements over a communications network.

7. The photovoltaic array performance monitoring system of claim 1 wherein the computing system comprises:
a main memory having instructions which when executed by a central processing unit, cause the central processing unit to:
prepare electrical differential data from the encoded indicia of electrical energy measurements, the electrical differential data having a functional relationship with data representing temporal changes in revenue derived from sales of electrical energy produced by the photovoltaic array;
compare the data representing temporal changes in revenue with data representing remediation costs to remove the soiling from the photovoltaic array; and
output a message in a human cognizable or machine readable format when removal of deposited soiling materials is cost effective relative to a decline in revenue due to soiling of the photovoltaic array.

8. A photovoltaic array performance monitoring system comprising:
a data acquisition unit comprising:
a reference input adapted to receive electrical energy generated by a reference photovoltaic panel, the reference photovoltaic panel including a soiling removal unit adapted to remove deposited soiling materials from an active photovoltaic collection area of the reference photovoltaic panel;
an ambient input adapted to receive electrical energy generated by an ambient photovoltaic panel, the ambient photovoltaic panel being disposed in proximity to the reference photovoltaic panel such that a spatial distribution of the soiling materials are approximately equal upon the active photovoltaic collection area of the reference photovoltaic panel and an active photovoltaic collection area of the ambient photovoltaic panel;
a processor;
an analog to digital converter functionally coupled to the processor and the reference and ambient inputs;
a communications interface functionally coupled to the processor to enable the data acquisition unit to transmit data over an operatively coupled communications network;
a memory functionally coupled to the processor, the memory including instructions which when executed by the processor cause the processor to:
regularly initiate the soiling removal unit cleaning the reference photovoltaic panel;
periodically measure the electrical energy incident upon the reference and ambient inputs;
encode indicia of the measured electrical energy of the reference and ambient inputs into a communications protocol; and
transmit the encoded indicia of the electrical energy measurements over the communications network to a computing system.

9. The photovoltaic array performance monitoring system of claim 8 further comprising a computing system, wherein the computing system comprises:
a main memory having instructions which when executed by a central processing unit, cause the central processing unit to:
prepare electrical differential data from the encoded indicia of electrical energy measurements, the electrical differential data having a functional relationship with data representing temporal changes in revenue derived from sales of electrical energy produced by the photovoltaic array;
compare the data representing temporal changes in revenue with data representing remediation costs to remove the soiling from the photovoltaic array; and
output a message in a human cognizable or machine readable format when removal of deposited soiling materials is cost effective relative to a decline in revenue due to soiling of the photovoltaic array.

10. The photovoltaic array performance monitoring system of claim 9 wherein cost effective represents a financial cost of lost revenue due to soiling of the photovoltaic array that is equal to or greater than an remediation cost to remove soiling from the photovoltaic array.

11. The photovoltaic array performance monitoring system of claim 8 wherein the reference and ambient photovoltaic panels are disposed in proximity to the photovoltaic array such that a spatial distribution of the soiling materials are approximately equal upon the active photovoltaic collection areas of the reference and ambient photovoltaic panels and further representative of members of the photovoltaic array.

12. The photovoltaic array performance monitoring system of claim 8 wherein the soiling removal unit comprises:
a control circuit coupled with the processor;
a pump;
a reservoir in fluidic communication with a suction side of the pump;
a spray nozzle in fluidic communication with a discharge side of the pump;
an electromechanical interface functionally coupled to the control circuit and the pump, the electromechanical interface adapted to operate the pump when triggered by the control circuit.

13. The photovoltaic array performance monitoring system of claim 12 wherein the reservoir contains a cleaning fluid which is drawn into the pump during pump operation and discharged through the spray nozzle onto the active photovoltaic collection area of the reference photovoltaic panel.

14. A computer implemented process for monitoring photovoltaic array performance comprising:
providing a data acquisition unit having a reference electrical input and an ambient electrical input, the reference input adapted to receive electrical energy generated by a reference photovoltaic panel, the reference photovoltaic panel including a soiling removal unit for removing deposited soiling materials from an active photovoltaic collection area of the reference photovoltaic panel;
the ambient input adapted to receive electrical energy generated by a ambient photovoltaic panel, the ambient photovoltaic panel being disposed in proximity to the reference photovoltaic panel such that a spatial distribution of the soiling materials are approximately equal upon the active photovoltaic collection area of the reference and ambient photovoltaic panels;
the data acquisition unit including a processor and a memory functionally coupled thereto, the memory including instructions which when executed by the processor cause the processor to implement the computer implemented process comprising:

periodically measuring the electrical energy incident upon the reference and ambient inputs;

encoding indicia of the measured electrical energy of the reference and ambient inputs into a communications protocol; and transmitting the encoded indicia of the electrical energy measurements to a computing system communicatively coupled with the data acquisition unit.

15. The computer implemented process of claim 14 further comprising:

determining by the computing system, electrical differential data from the encoded indicia of electrical energy measurements, the electrical differential data having a functional relationship with data representing temporal changes in revenue derived from sales of electrical energy produced by the photovoltaic array;

comparing the data representing temporal changes in revenue with data representing remediation costs to remove the soiling from the photovoltaic array; and outputting a message in a human cognizable or machine readable format when removal of deposited soiling materials is cost effective relative to a decline in revenue due to soiling of the photovoltaic array.

16. The computer implemented process of claim 14 further comprising:

periodically activating a control circuit for a predetermined duration, the control circuit being functionally coupled to the soiling removal unit;

wherein activating the control circuit causes the soiling removal unit to remove soiling materials deposited upon the active photovoltaic collection area of the reference photovoltaic panel.

17. The computer implemented process of claim 14 wherein the reference and ambient photovoltaic panels are disposed in proximity to the photovoltaic array such that a spatial distribution of the soiling materials are approximately equal upon the active photovoltaic collection areas of the reference and ambient photovoltaic panels and those of the photovoltaic array.

18. The computer implemented process of claim 16 wherein the soiling removal unit comprises:

a pump;

a reservoir in fluidic communication with a suction side of the pump;

a spray nozzle in fluidic communication with a discharge side of the pump;

an electromechanical interface functionally coupled to the control circuit and the pump, the electromechanical interface adapted to operate the pump when activated by the control circuit.

19. The computer implemented process of claim 18 wherein the reservoir contains a cleaning fluid which is drawn into the pump during pump operation and discharged through the spray nozzle onto a transparent surface superjacent to the active photovoltaic collection area of the reference photovoltaic panel.

* * * * *